(12) United States Patent
Ito et al.

(10) Patent No.: US 7,963,595 B2
(45) Date of Patent: Jun. 21, 2011

(54) VEHICLE SEATS

(75) Inventors: Hidehiro Ito, Aichi-ken (JP); Hisaya Mori, Aichi-ken (JP); Yasuhiko Niimi, Handa (JP); Yuji Ito, Okazaki (JP)

(73) Assignees: Toyota Boshoku Kaisha, Aichi-Ken (JP); Denso Corporation, Aichi-Ken (JP)

( * ) Notice: Subject to any disclaimer, the term of this patent is extended or adjusted under 35 U.S.C. 154(b) by 53 days.

(21) Appl. No.: 12/474,496

(22) Filed: May 29, 2009

(65) Prior Publication Data
US 2009/0295200 A1 Dec. 3, 2009

(30) Foreign Application Priority Data

Jun. 3, 2008 (JP) ................................ 2008-145952

(51) Int. Cl.
*A47C 7/74* (2006.01)
(52) U.S. Cl. ............. 297/180.14; 297/180.1; 297/180.13
(58) Field of Classification Search ................ 297/180.1, 297/180.13, 180.14
See application file for complete search history.

(56) References Cited

U.S. PATENT DOCUMENTS

| | | | | |
|---|---|---|---|---|
| 4,685,727 A | * | 8/1987 | Cremer et al. | 297/180.14 |
| 6,179,706 B1 | * | 1/2001 | Yoshinori et al. | 297/180.14 X |
| 6,478,369 B1 | * | 11/2002 | Aoki et al. | 297/180.13 |
| 6,676,207 B2 | * | 1/2004 | Rauh et al. | 297/180.14 |
| 6,685,553 B2 | * | 2/2004 | Aoki | 297/180.14 X |
| 6,722,148 B2 | * | 4/2004 | Aoki et al. | 297/180.13 X |
| 6,736,452 B2 | * | 5/2004 | Aoki et al. | 297/180.13 |
| 6,761,399 B2 | * | 7/2004 | Bargheer et al. | 297/180.14 X |
| 6,848,742 B1 | * | 2/2005 | Aoki et al. | 297/180.14 |
| 6,929,322 B2 | * | 8/2005 | Aoki et al. | 297/180.14 |
| 7,028,493 B2 | * | 4/2006 | Tomita et al. | 297/180.14 X |
| 7,261,372 B2 | * | 8/2007 | Aoki | 297/180.14 |
| 7,275,984 B2 | * | 10/2007 | Aoki | 297/180.13 X |
| 7,581,785 B2 | * | 9/2009 | Heckmann et al. | 297/180.14 |
| 2003/0102699 A1 | * | 6/2003 | Aoki et al. | 297/180.14 |
| 2006/0087160 A1 | * | 4/2006 | Dong et al. | 297/180.13 |
| 2006/0138812 A1 | * | 6/2006 | Aoki | 297/180.14 |
| 2007/0063551 A1 | * | 3/2007 | Gasic et al. | 297/180.1 |
| 2007/0246975 A1 | * | 10/2007 | Bier et al. | 297/180.1 |
| 2007/0262621 A1 | * | 11/2007 | Dong et al. | 297/180.12 |
| 2008/0290703 A1 | * | 11/2008 | Bargheer et al. | 297/180.14 |
| 2009/0079236 A1 | | 3/2009 | Itou et al. | |

FOREIGN PATENT DOCUMENTS

JP 2005-34345 2/2005

OTHER PUBLICATIONS

English language Abstract of JP 2005-34345, Feb. 10, 2005.

* cited by examiner

*Primary Examiner* — Rodney B White
(74) *Attorney, Agent, or Firm* — Greenblum & Bernstein, P.L.C.

(57) ABSTRACT

A vehicle seat includes a seat back and a head rest. The seat back has an air blower that is capable of aspirating air, and a blower duct that is capable of introducing the aspirated air toward a blowhole formed in the seat back. The head rest has a head rest main body and a stay attached to the head rest main body. The stay is inserted into the seat back, so that the head rest main body is vertically movably attached to the seat back. The air blower is disposed on the seat back such that a rotation center thereof can be positioned above the level of a terminal end of the stay that is moved to a lowermost position.

10 Claims, 4 Drawing Sheets

VEHICLE SEATS

This application claims priority to Japanese patent application serial number 2008-145952, the contents of which are incorporated herein by reference.

BACKGROUND OF THE INVENTION

1. Field of the Invention

The present invention relates to vehicle seats. More particularly, the present invention relates to vehicle seats having air blowers that can send air toward passengers sitting on the vehicle seats.

2. Description of Related Art

A vehicle seat having an air blower is already known. Such a vehicle seat is taught, for example, by Japanese Laid-Open Patent Publication No. 2005-34345. In the vehicle seat, the air blower is embedded in a seat back, so as to send air toward the back of a passenger sitting on the vehicle seat in order to provide cool air toward the passenger.

Generally, in such a vehicle seat, the air blower is an axial-flow blower having an axial-flow fan and is disposed on a central portion of the seat back. Therefore, it is necessary to form a sufficient-sized air chamber (space) in the central portion of the seat back, so that the axial-flow fan can aspirate air therefrom. However, the central portion of the seat back of the vehicle seat must be most easily flexed or deformed in order to increase sitting comfort of the passenger. Therefore, it is necessary to design the air chamber in anticipation of volume reduction thereof caused by deformation of the seat back. As a result, the seat back must be increased in thickness.

Further, in order to prevent rotation of the axial-flow fan from being disturbed when the seat back is pressed from before by the back of the passenger (or when the seat back is pressed from behind by the knees of a person sitting on a rear seat), the axial-flow fan is attached to the seat back so as to follow flexing motion of the central portion of the seat back. In particular, the axial-flow fan is attached to an elastic member (a spring member) of the seat back.

However, the thickened seat back may cause a vehicle cabin to narrow. In addition, the thickened seat back may have inferior appearance.

Further, when the axial-flow fan is attached to the elastic member of the seat back, the elastic member can resonate with vibration caused by rotation of the axial-flow fan. Resonantly-generated vibration of the elastic member may sometimes provide strong discomfort to the passenger. Therefore, it is necessary to design the elastic member in order to eliminate resonance of the elastic member. This may lead to increased manufacturing costs.

BRIEF SUMMARY OF THE INVENTION

For example, in one aspect of the present invention, a vehicle seat includes a seat back and a head rest. The seat back has an air blower that is capable of aspirating air, and a blower duct that is capable of introducing the aspirated air toward a blowhole formed in the seat back. The head rest has a head rest main body and a stay attached to the head rest main body. The stay is inserted into the seat back, so that the head rest main body is vertically movably attached to the seat back. The air blower is disposed on the seat back such that a rotation center thereof can be positioned above the level of a terminal end of the stay that is moved to a lowermost position.

According to this seat, the air blower is disposed on an upper portion of the seat back. Even if a central portion of the seat back is deformed, the seat back upper portion cannot substantially be deformed. Therefore, rotation of the air blower cannot be disturbed.

Further, an air chamber formed in front of the air blower cannot substantially be reduced in volume even if the central portion of the seat back is deformed. Therefore, it is not necessary to form the air chamber having large capacity in anticipation of volume reduction thereof caused by the deformation of the seat back. As a result, the air blower can be attached to the seat back without increasing thickness thereof.

In one embodiment, the air blower is connected to a back frame of the seat back via a bracket. That is, the air blower is not attached to an elastic member of the seat back. Therefore, the elastic member can be effectively prevented from resonating with vibration caused by rotation of the air blower. As a result, resonantly-generated vibration of the elastic member can be prevented.

In another embodiment, the air blower comprises a centrifugal air blower. Therefore, it is not necessary to provide the air chamber having large capacity. As a result, the air blower can be attached to the seat back without increasing thickness of the seat back.

In a further embodiment, the blowhole is formed in a back pad of the seat back. Further, the blowhole is arranged so as to open at each side of a pullin groove formed in the back pad. Therefore, the air can be effectively and widely sent toward the back of the passenger.

Other objects, features, and advantages, of the present invention will be readily understood after reading the following detailed description together with the accompanying drawings and the claims.

DETAILED DESCRIPTION OF THE INVENTION

Figure 1:
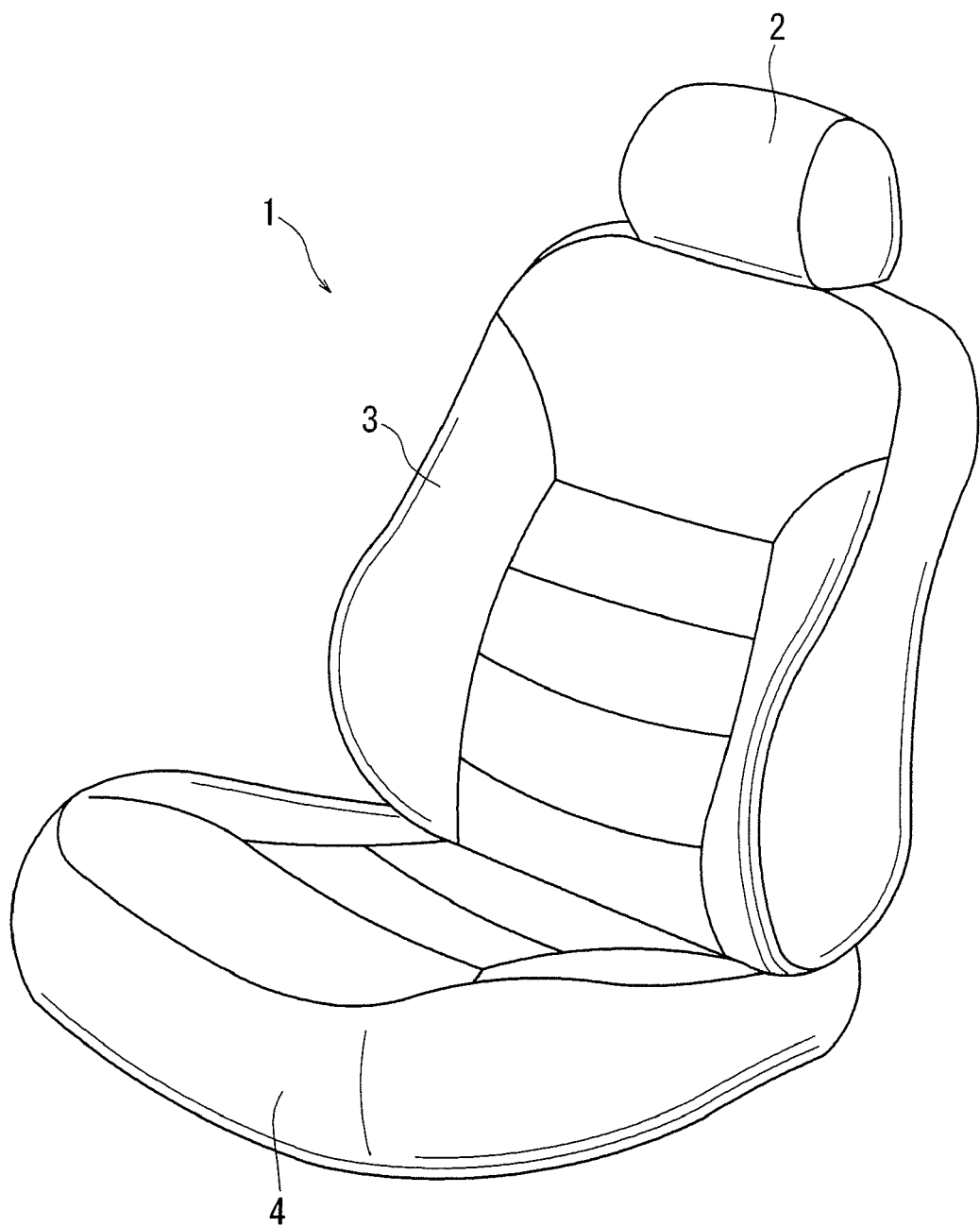
FIG. 1 is a front perspective view of a vehicle seat according to a representative embodiment of the present invention.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

A detailed representative embodiment of the present invention will be described with reference FIGS. 1 to 4.

Further, forward and rearward, rightward and leftward, and upward and downward in the drawings respectively correspond to forward and rearward, rightward and leftward, and upward and downward of a vehicle.

As shown in FIG. 1, a representative vehicle seat 1 (a driver's seat) may preferably include a seat back 3 having a head rest 2, and a seat cushion 4. The seat back 3 is rotatably connected to the seat cushion 4 via a seat reclining device (not shown), so that a tilting angle of the seat back 3 relative to the seat cushion 4 can be adjusted by operating the seat reclining device.

Figure 2:
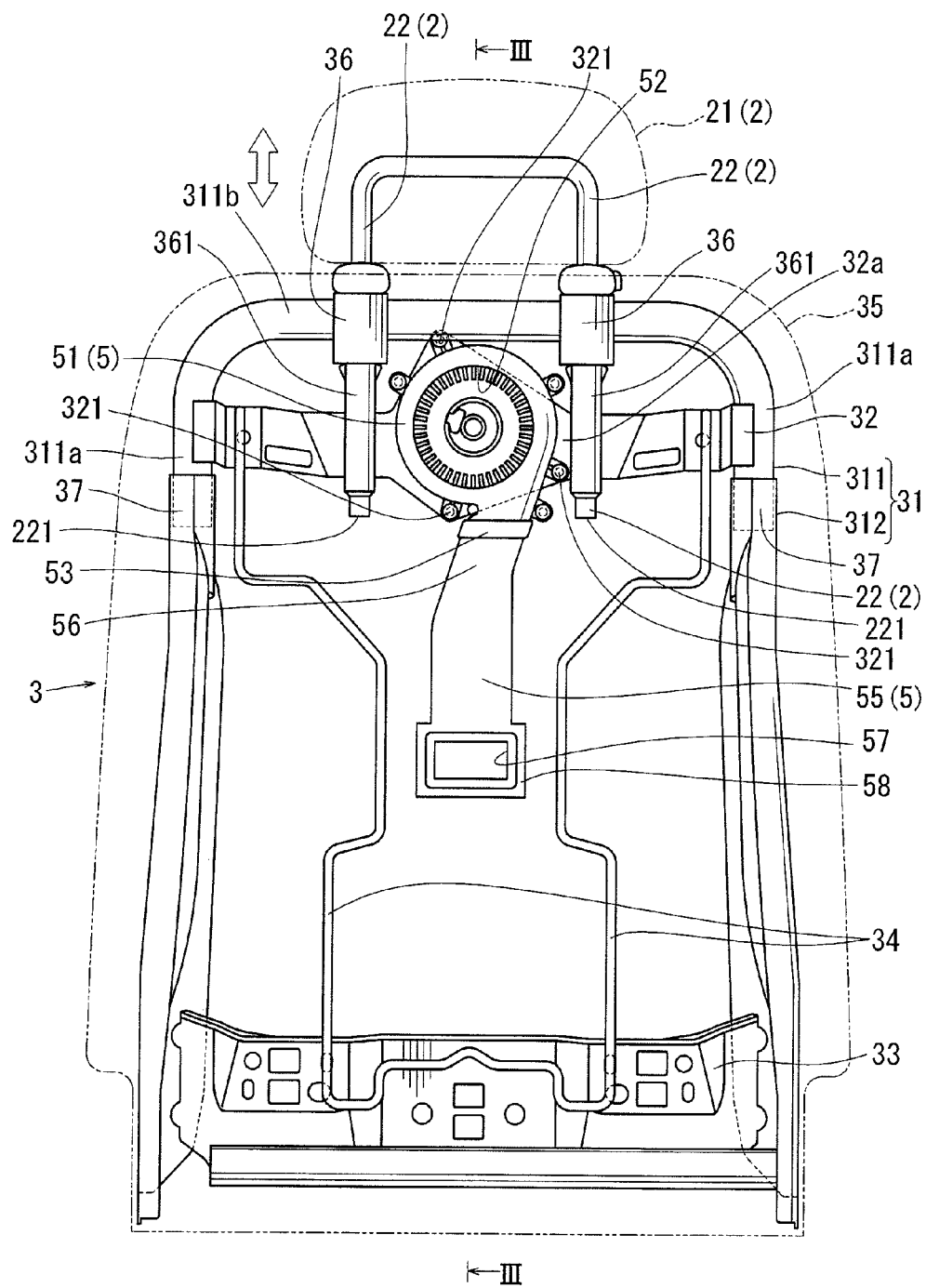
FIG. 2 is an elevational view of a seat back of the vehicle seat in a condition in which a head rest is moved to a lowermost position (i.e., a condition in which stays are moved to lowermost positions), which illustrates a framework or inner structure thereof.

As shown in FIG. 2, the seat back 3 is essentially constructed of a back frame 31, an upper bracket 32, a lower bracket 33, a support spring 34, and a back pad 35 attached to the back frame 31. In addition, the seat back 3 is provided with an air blower device 5.

The back frame 31 is composed of a U-shaped upper frame portion 311 that is made of a metal pipe, and lower or side frame portions 312 that are respectively made of shaped metal sheets. The upper frame portion 311 has vertical portions 311a and a lateral portion 311b. Conversely, each of the side frame portions 312 has an upper coupling portion that can be formed by drawing. The upper frame portion 311 (the vertical portions 311a) can be connected to the upper coupling portions of the side frame portions 312 by welding (spot welding). Further, the upper frame portion 311 is provided with a pair of cylindrical head rest attachment members 36. The head rest attachment members 36 are respectively vertically positioned in front of the lateral portion 311b of the upper frame portion 311 while laterally spaced from each other at a desired interval (about 150 mm in this embodiment). Each of the head rest attachment members 36 has a stay support sleeve 361 that is vertically downwardly extended therefrom.

The upper bracket 32 is formed by bending a metal sheet and is attached to the upper frame portion 311. As best shown in FIG. 2, the upper bracket 32 is positioned so as to bridge the vertical portions 311a of the upper frame portion 311. Further, the upper bracket 32 may preferably be positioned adjacent to connected portions 37 of the upper frame portion 311 and the side frame portions 312.

Figure 3:
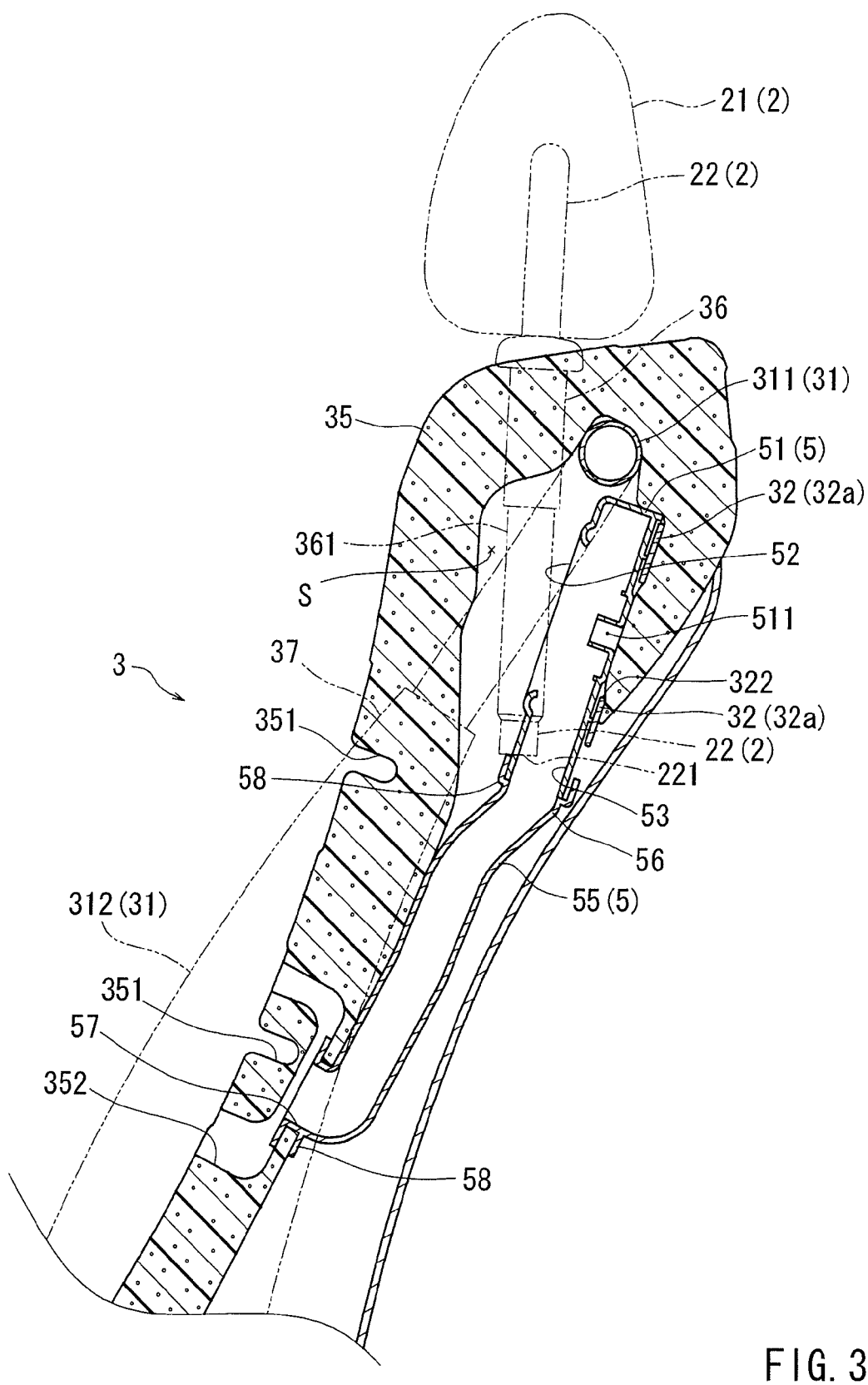
FIG. 3 is a cross-sectional view taken along line III-III in FIG. 2.
Figure 4:
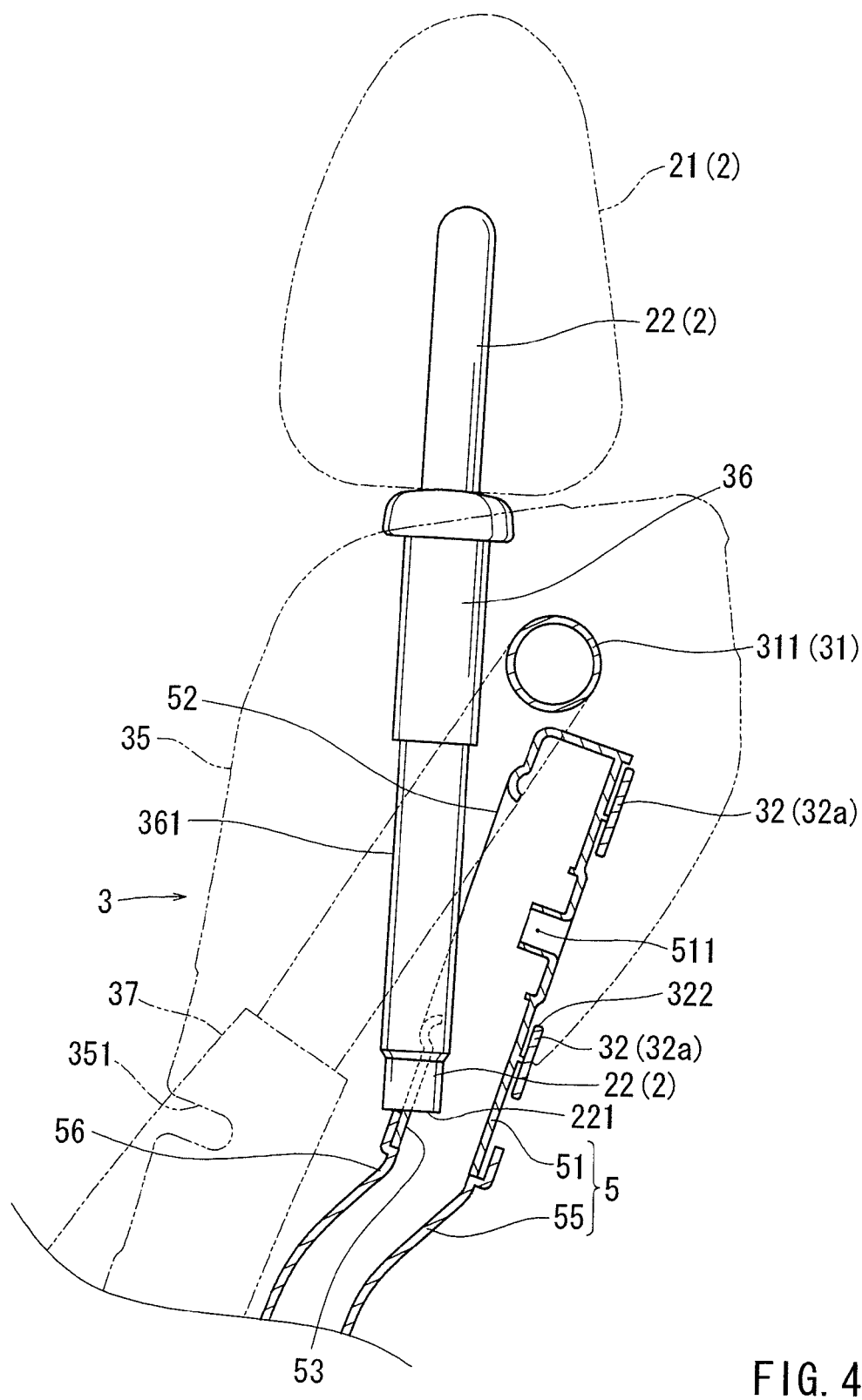
FIG. 4 is a partially enlarged view of FIG. 3, which illustrate a positional relation between the stay and a blower.

Further, as shown in FIG. 2, the upper bracket 32 has a widened portion 32a that is formed in a central portion thereof. The widened portion 32a has a circular opening 322 (FIGS. 3 and 4) that is formed therein, which will be described hereinafter. As shown in FIGS. 3 and 4, the upper bracket 32 may preferably be shaped such that the central portion thereof (the widened portion 32a) can be displaced or offset rearwardly (rightwardly in FIGS. 3 and 4) with respect to the back frame 31 (the upper frame portion 311). Also, the upper bracket 32 may preferably be shaped such that the central portion thereof (the widened portion 32a) can be displaced (offset) rearwardly with respect to the stay support sleeves 361 of the head rest attachment members 36.

The lower bracket 33 is formed by bending a metal sheet and is attached to the lower frame portions 312. As best shown in FIG. 2, the lower bracket 33 is positioned so as to bridge the lower frame portions 312. Further, the lower bracket 33 may preferably be positioned, at lower end portions of the lower frame portions 312.

The support spring 34 is intended to retain the back pad 35. The support spring 34 is made of a wire spring and is formed to a special shape. The support spring 34 thus formed is positioned between the upper and lower brackets 32 and 33 and is fixedly connected thereto. The support spring 34 thus arranged and constructed is capable of flexing back and forth, so as to flexibly support the back pad 35.

The back pad 35 is made from urethane resins or other such materials having desired deformability and compressibility and is formed to a desired shape. As shown in FIG. 3, the back pad 35 has a plurality of pull-in grooves 351 that are formed in an outer surface thereof. The pull-in grooves 351 are used when a (detachable) seat cover (not shown) is attached to the back pad 35. In particular, when the seat cover is attached to the back pad 35, the seat cover is partially pulled into the pull-in groove 351, so as to be reliably attached to the back pad 35. That is, the pull-in grooves 351 are intended to form a pull-in structure between the seat cover and the back pad 35 in order to increase surface appearance of the seat back 3 (the attached seat cover). Also, as shown in FIG. 3, the back pad 35 has a blowhole 352 that is formed in a substantially central portion of the outer surface thereof. The blowhole 352 may preferably be arranged and shaped so as to open at each side of the pull-in grooves 351.

As shown in FIG. 2, the head rest 2 may preferably include a head rest main body 21 and a pair of stays 22 integrally connected to the head rest main body 21. The head rest main body 21 is provided with a cushion pad that can be made from urethane resins or other such materials. Conversely, the stays 22 can be integrally made of a steel rod. The stays 22 can be laterally spaced from each other at a desired interval (about 150 mm in this embodiment). Further, the stays 22 are respectively connected to the head rest main body 21 so as to be vertically projected downwardly therefrom. The stays 22 thus constructed are respectively slidably inserted into the stay support sleeves 361 of the head rest attachment members 36, so that the head rest main body 21 (the head rest 2) is vertically movable with respect to the back frame 31 (the seat back 3). Thus, the head rest 2 can be adjusted so as to have desired height with respect to the seat back 3. Further, as shown in FIGS. 2 to 4, the stays 22 (the head rest attachment members 36) may preferably be arranged and constructed such that terminal ends 221 of the stays 22 (which may be referred to as most-lowered terminal ends of the stays 22) can be positioned closer to the connected portions 37 of the upper frame portion 311 and the side frame portions 312 when the stays 22 are moved to lowermost positions thereof.

The air blower device 5 is essentially composed of an air blower 51 (a centrifugal air blower) that is capable of aspirating air, and a blower duct 55 that is capable of introducing the aspirated air toward the blowhole 352 formed in the back pad 35 of the seat back 3. The air blower 51 may preferably be a sirocco fan that can be received within a space (150 mm in width) formed between the stays 22.

As shown in FIG. 2, the air blower 51 is attached to the widened portion 32a (the central portion) of the upper bracket 32 via fastening members 321, e.g., screws and rivets. At this time, the air blower 51 is positioned within the space formed between the stays 22. Thus, the air blower 51 is connected to the back frame 31 via the upper bracket 32. As will be appreciated, the widened portion 32a of the upper bracket 32 may previously shaped so as to receive and support the air blower 51.

Further, as best shown in FIGS. 3 and 4, the air blower 51 may preferably be arranged such that a rotation center 511 thereof can be positioned above the level of the terminal ends 221 of the stays 22 that are moved to the lowermost positions (i.e., above the level of the most-lowered terminal ends of the stays 22). In other words, the air blower 51 may preferably be arranged such that the rotation center 511 thereof can be positioned above the level of the connected portions 37 of the upper frame portion 311 and the side frame portions 312.

Further, as previously described, the widened portion 32a (the central portion) of the upper bracket 32 is displaced or offset rearwardly (rightwardly in FIGS. 3 and 4) with respect to the back frame 31 (the upper frame portion 311). Also, the widened portion 32a (the central portion) of the upper bracket 32 is displaced or offset rearwardly with respect to the stay support sleeves 361 (the stays 22). As a result, the air blower 51 attached to the widened portion 32a of the upper bracket 32 is displaced or offset rearwardly with respect to the stays 22 and the back-frame 31. Therefore, a desired-sized air chamber S can be formed in the seat back 3 (the back pad 35), so as to be positioned in front of the air blower 51 that is attached to the widened portion 32a of the upper bracket 32.

Further, as shown in FIGS. 3 and 4, the air blower 51 has an air aspiration port 52 and an air blow port 53. Naturally, the air blower 51 is attached to the widened portion 32a of the upper bracket 32 while the air aspiration port 52 faces the air chamber S that is formed in the seat back 3 (the back pad 35). Also, the air blower 51 is positioned such that the air blow port 53 can be directed downwardly, As shown in FIG. 3, the blower duct 55 can be made from elastomer resins having high elasticity and high flexibility and is a tubular member having a rectangular shape in cross section. The blower duct 55 has an air inlet port 56 formed in an upper end thereof and an air outlet port 57 formed in a lower end thereof. Further, the air inlet port 56 and the air outlet port 57 are respectively provided with annular flanged portions 58. The air inlet port 56 is coupled to the air blow port 53 of the air blower 51 via the flanged portion 58. Conversely, the air outlet port 57 is coupled to the blowhole 352 of the back pad 35 via the flanged portion 58.

As described above, in the vehicle seat 1 (the seat back 3), the air blower 51 is disposed such that the rotation center 511 thereof is positioned above the level of the terminal ends 221 of the stays 22 that are moved to the lowermost positions (above the level of the most-lowered terminal ends of the stays 22). In other words, the air blower 51 is positioned at a seat back upper portion (an upper end portion of the seat back 3) that is upwardly spaced from a most-flexible central portion of the seat back 3. Even if the central portion of the seat back 3 is flexed or deformed, the seat back upper portion cannot substantially be deformed. Therefore, the air blower 51 is less subject to influence caused by flex or deformation of the seat back 3. In particular, rotation of the air blower 51 cannot be disturbed.

In addition, the air chamber S is formed in front of the air blower 51. Therefore, the air chamber S cannot substantially be reduced in volume when the central portion of the seat back 3 is flexed or deformed. This means that it is not necessary to design the air chamber S in anticipation of volume reduction thereof caused by the flex or deformation of the seat back 3. That is, it is not necessary to increase capacity of the air chamber S. As a result, the air blower 51 can be attached to the seat back 3 without increasing thickness thereof. That is, the air blower 51 can be attached to the seat back 3 without excessively narrowing a vehicle cabin and excessively deteriorating appearance of the seat back 3.

Further, in the vehicle seat 1 (the seat back 3), the air blower 51 is positioned within the space formed between the stays 22, which space can be reliably rigidified due to rigidity of the stays 22. Therefore, even if the central portion of the seat back 3 is flexed, the space formed between the stays 22 is not going to be substantially affected. As a result, the air blower 51 is further less subject to the influence caused by flex or deformation of the seat back 3. Further, the air chamber S can be further reliably prevented from being reduced in volume when the central portion of the seat back 3 is flexed.

Further, the air blower 51 is attached to the upper bracket 32 and not the support spring 34 (an elastic member) of the seat back 3. Therefore, the elastic member (the support spring 34) can be effectively prevented from resonating with vibration caused by rotation of the air blower 51. As a result, resonantly-generated vibration of the elastic member can be prevented. This means that a passenger sitting on the vehicle seat 1 can be prevented from being subjected to discomfort. In addition, it is not necessary to design the elastic member in order to eliminate resonance of the elastic member. This may lead to reduced manufacturing costs.

Further, the air blower 51 is displaced rearwardly with respect to the stays 22. Therefore, the air chamber S formed in front of the air blower 51 can substantially be increased in volume. As a result, the air blower 51 can effectively and sufficiently aspirate the air in the air chamber S.

In this embodiment, the centrifugal air blower (in particular, the sirocco fan) is used as the air blower 51. Therefore, it is not necessary to provide a large capacity air chamber. As a result, the air blower 51 can be attached to the seat back 3 without substantially increasing thickness thereof. That is, the air blower 51 can be attached to the seat back 3 without substantially narrowing a vehicle cabin and substantially deteriorating appearance of the seat back 3.

Further, in this embodiment, the blowhole 352 is formed in the back pad 35 so as to open at each side of the pull-in grooves 351. Therefore, the air can be effectively and widely sent toward the back of the passenger.

The blower duct 55 can be made from the elastomer resins having high elasticity and high flexibility. Therefore, when the seat back 3 is flexed or deformed, the blower duct 55 can be deformed depending on deformation of the seat back 3 without being damaged or broken. Conversely, when the seat back 3 is restored to a normal condition, the blower duct 55 can be restored to a normal shape. Therefore, the air can be reliably sent from the air blow port 53 of the air blower 51 to the blowhole 352 of the back pad 35 via the blower duct 55.

Further, when the seat back 3 is deformed, the blower duct 55 can be easily deformed without precluding the deformation of the seat back 3. Therefore, the seat back 3 can be naturally deformed when the passenger sits on the vehicle seat 1.

Naturally, various changes and modifications may be made to the present invention without departing from the scope of the invention. For example, the vehicle seat 1 is not limited to the driver's seat. Further, the vehicle seat 1 can be a seat that additionally includes arm rests or other such additional elements.

Further, the air blower 51 is not limited to the sirocco fan. That is, the air blower 51 can be a multi-blade centrifugal air blower (fan), an axial-flow blower (fan) or other such blowers.

In this embodiment, the blowhole 352 is formed in the substantially central portion of the back pad 35. However, the blowhole 352 can be positioned adjacent to the air blow port 53 of the air blower 51. That is, the blowhole 352 can be formed in an upper portion of the back pad 35. In such a structure, the blower duct 55 can be shortened. This may lead to reduced manufacturing costs. In addition, a shortened blower duct can have a low pressure loss, so that the air can be more effectively sent toward the passenger.

What is claimed is:
1. A vehicle seat comprising:
   a seat back having an air blower that is capable of aspirating air, and a blower duct that is capable of introducing the aspirated air toward a blowhole formed in the seat back;
   a head rest having a head rest main body and a stay attached to the head rest main body, and
   a stay support member that is located on an upper portion of the seat back wherein the stay is inserted into the seat back via the stay support member so that the head rest main body is vertically movably attached to the seat back, wherein the air blower is positioned on the seat back such that a rotation center of the air blower is located above a terminal end of the stay when the stay is in a lowermost position, and wherein the air blower is located such that a rotation center of the air blower is positioned between upper and lower ends of the stay support member.

2. The vehicle seat as defined in claim 1, wherein the air blower is connected to a back frame of the seat back via a bracket.

3. The vehicle seat as defined in claim 1, wherein the air blower comprises a centrifugal air blower.

4. The vehicle seat as defined in claim 1, wherein the blowhole is provided in a back pad of the seat back, and wherein the blowhole is arranged so as to open at each side of a pull-in groove formed in the back pad.

5. The vehicle seat according to claim 1, the blowhole being located beneath the air blower, the blower duct extending generally vertically within the seat back and connecting the air blower with the blowhole so that air aspirated by the air blower is ejected from the blowhole.

6. The vehicle seat according to claim 1, further comprising an air aspiration port that faces an air chamber provided in the seat back, and an air blowing port that is distinct from the air aspiration port, the blower duct being configured to be connected to the air blowing port.

7. The vehicle seat according to claim 1, further comprising an air aspiration port and an air blowing port, distinct from the air aspiration port, the air blower ejecting air through the air aspiration port and through the air blowing port.

8. The vehicle seat according to claim 1, the blowhole being displaced from the rotation center of air blower.

9. The vehicle seat according to claim 1, the blowhole being provided at a substantially central portion of a back pad of the seat back.

10. The vehicle seat according to claim 1, wherein the air blower is connected to a back frame of the seat back within the seat back.

\* \* \* \* \*